(12) United States Patent
Fujii et al.

(10) Patent No.: US 7,306,877 B2
(45) Date of Patent: Dec. 11, 2007

(54) BATTERY TERMINAL (75) Inventors: Gaku Fujii, Susono (JP); Kunihiko Akamatsu, Susono (JP)

(73) Assignee: Yazaki Corporation, Tokyo (JP)

( * ) Notice: Subject to any disclaimer, the term of this patent is extended or adjusted under 35 U.S.C. 154(b) by 491 days.

(21) Appl. No.: 10/942,857

(22) Filed: Sep. 17, 2004

(65) Prior Publication Data
US 2005/0064285 A1  Mar. 24, 2005

(30) Foreign Application Priority Data
Sep. 19, 2003  (JP) ............ P2003-328900

(51) Int. Cl.
*H01M 2/30* (2006.01)
(52) U.S. Cl. ............ 429/65; 429/175; 429/178
(58) Field of Classification Search ........... 429/65
See application file for complete search history.

(56) References Cited

U.S. PATENT DOCUMENTS 5,503,642 A  *  4/1996  Lippert et al. ............ 29/623.1

FOREIGN PATENT DOCUMENTS

JP  10-12214 A  1/1998

* cited by examiner

*Primary Examiner*—Jonathan Crepeau
*Assistant Examiner*—Tony Chuo
(74) *Attorney, Agent, or Firm*—Sughrue Mion, PLLC (57) ABSTRACT

A corrosion-protective cover 3 is molded of a synthetic resin. The corrosion-protective cover 3 includes a base plate portion 29 having a battery post insertion hole, first hook portions 30 and 30 formed at a rear end of the base plate portion 29 so as to be engaged with a wire connection portion 9, and a second hook portion 31 of a generally U-shape which is formed at a front end of the base plate portion 29, and has elasticity, and can be retainingly fitted on curved surfaces 40 and 40 of fastening portions 6 and 6, with the first hook portions 30 and 30 engaged with the wire connection portion 9.

8 Claims, 11 Drawing Sheets

PRIOR ART

FIG. 11

PRIOR ART

BATTERY TERMINAL

BACKGROUND OF THE INVENTION

1. Field of the Invention

This invention relates to a battery terminal which comprises a battery terminal body for mounting on a battery post, and a corrosion-protective cover for preventing the corrosion of the battery terminal body.

2. Related Art

One known conventional battery terminal, including a battery terminal body and a corrosion-protective cover, is disclosed in Unexamined Japanese Patent Publication Hei. 10-12214.

Figure 11:
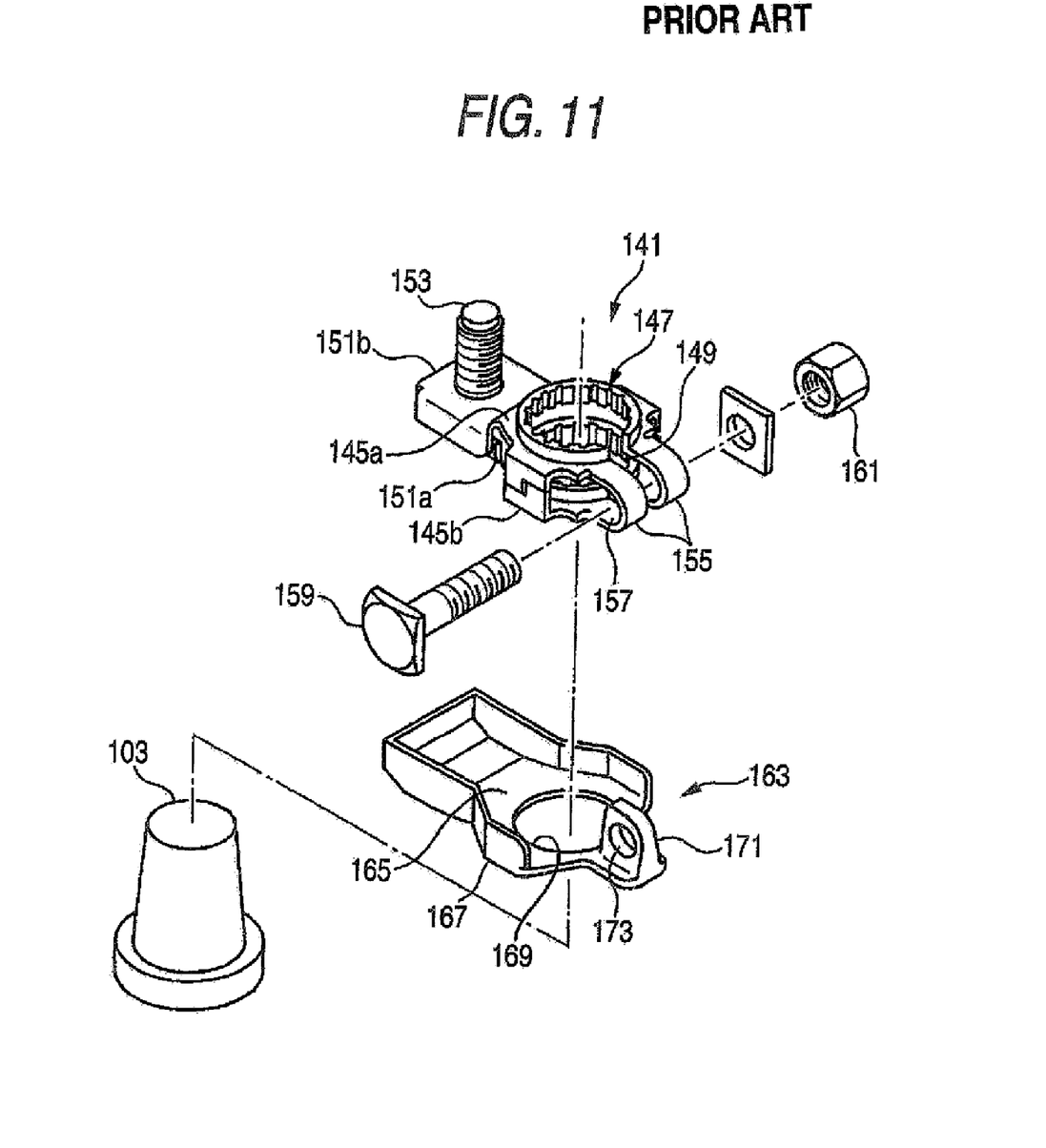
FIG. 11 is an exploded, perspective view of a conventional battery terminal.

In FIG. 11, the battery terminal body 141 includes a pair of annular portions 145a and 145b arranged in an upward-downward direction. A battery post insertion hole 147 for the insertion of a battery post 103 therein is formed in each of the annular portions 145a and 145b. Each of the annular portions 145a and 145b is interrupted at a portion thereof in a circumferential direction to provide a fastening gap 149, and therefore each annular portion 145a, 145b is open at this interrupted portion.

The upper and lower annular portions 145a and 145b are interconnected by a pair of fastening portions 155 and 155 formed adjacent to the fastening gaps 149. Joint plates 151a and 151b are formed respectively at those portions of the annular portions 145a and 145b disposed in diametrically-opposite relation to the fastening gaps 149, and these joint plates 151a and 151b are superposed together to form a wire connection portion. A terminal fixing bolt 153 is formed upright on the joint plate 151a.

A through hole 157 is formed through each of the pair of fastening portions 155 and 155 (interconnecting the upper and lower annular portions 145a and 145b) in a right-left direction. A fastening bolt 159 is passed through these through holes 157 generally in a manner to extend across the fastening gaps 149.

The fastening bolt 159, passing through the through holes 157, cooperates with a nut 161 (threaded on a distal end portion of this fastening bolt) to fasten the pair of fastening portions 155 and 155 (disposed respectively on the opposite sides of each fastening gap 149) toward each other. When this fastening operation is effected, the battery post insertion hole 147 in each annular portion 145a, 145b is reduced in diameter.

The corrosion-protective cover 163 is provided between the battery terminal body 141 and a battery. The corrosion-protective cover 163 has a bottom plate portion 165, and a wall portion 167 for surrounding side surfaces of the annular portions 145a and 145b and a side surface of the wire connection portion is formed at a peripheral edge of the bottom plate portion 165. A hole 169 for the passage of the battery post 103 therethrough is formed through a central portion of the bottom plate portion 165.

An interposition portion 171 for insertion into the fastening gaps 149 is formed upright at one end of the bottom plate portion 165. A through hole 173 for the passage of the fastening bolt 159 therethrough is formed through the interposition portion 171. The interposition portion 171 is tapering at its opposite side surfaces toward its distal end.

In the above construction, the interposition portion 171 of the corrosion-protective cover 163 is inserted into the fastening gaps 149 formed respectively in the annular portions 145a and 145b. The corrosion-protective cover 163 and the battery terminal body 141 are combined together, and the battery post 103 is inserted into the hole 169 and the battery post insertion holes 147.

Figure 12A:
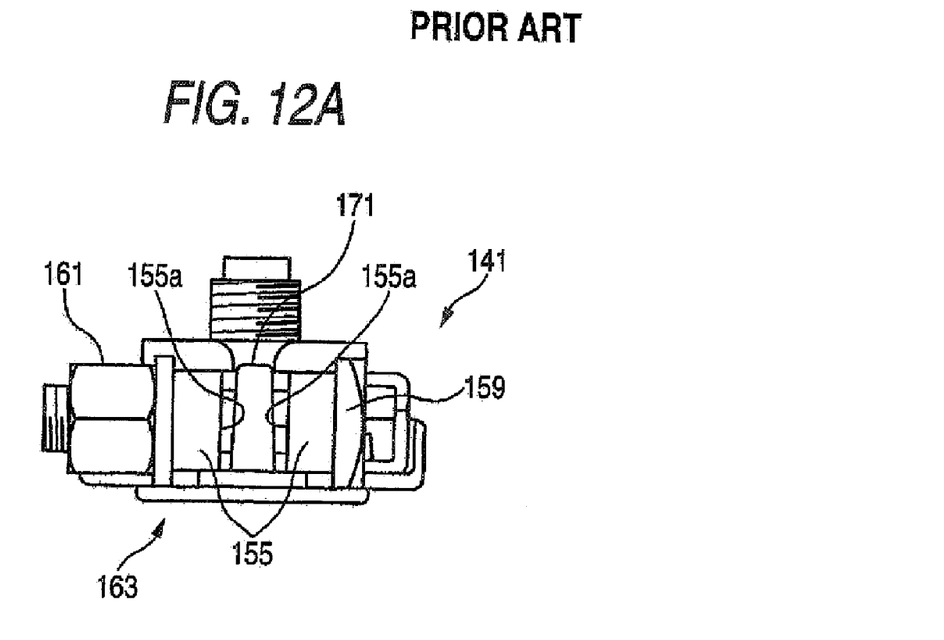
FIG. 12A is a view showing a condition in which a fastening operation is started.
Figure 12B:
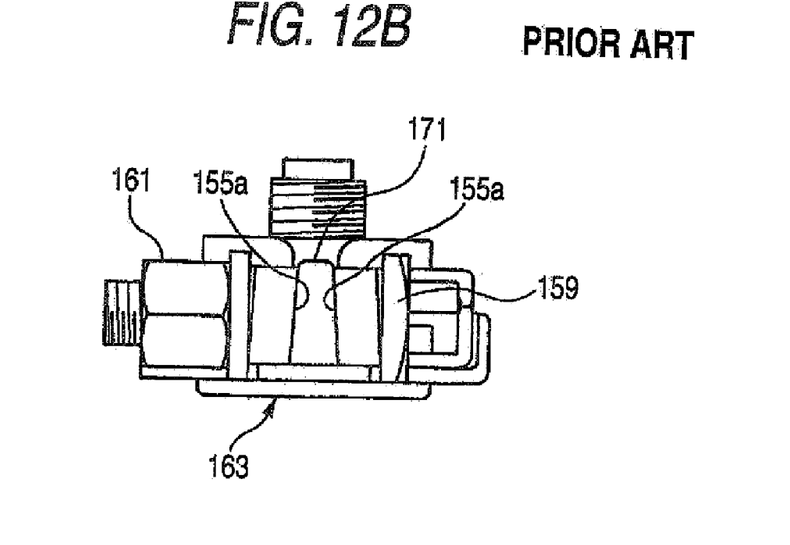
FIG. 12B is a view showing a condition in which the fastening operation is completed.

The fastening bolt 159 is passed through the pair of fastening portions 155 and 155 and the interposition portion 171, and the nut 161 is threaded on this fastening bolt, and is tightened. As a result, the pair of fastening portions 155 and 155 are moved toward each other, so that the annular portions 145a and 145b are brought into intimate contact with the outer peripheral surface of the battery post 103. The annular portions 145a and 145b, held in intimate contact with the battery post 103 of a tapering shape, are deformed in conformity with the tapering shape of the battery post 103, so that opposed edges 155a and 155a of the pair of fastening portions 155 and 155 are inclined in a downwardly-spreading manner as shown in FIG. 12. As a result, the opposed edges 155a and 155a become parallel to the corresponding opposite side surfaces of the interposition portion 171, respectively. When the nut 161 is further tightened, the opposed edges 155a and 155a makes a parallel translation to approach each other, and are held in contact with the opposite side surfaces of the interposition portion 171, respectively, in parallel relation thereto.

There are occasions when the battery terminal, once mounted on the battery post 103, need to be removed from the battery post 103. Therefore, the following problems are encountered. Namely, the pair of fastening portions 155 and 155 of the battery terminal, removed from the battery post 103, are slightly lowered in mechanical characteristics, and therefore when again mounting the battery terminal on the battery post 103, the fastening operation must be effected with a larger force as compared with the preceding fastening operation. In other words, the pair of the fastening portions 155 and 155 must be moved closer to each other as compared with the preceding fastening operation. As a result, when the mounting operation and the removing operation are repeated again and again, there is a fear that the mounting of the battery terminal on the battery post 103 is completed in such a manner that the fastening is not sufficiently effected because of interference of the inserted interposition portion 171. There is another fear that the interposition portion 171 is damaged by the large fastening force acting thereon.

And besides, in the above conventional technique, the joined condition of the corrosion-protective cover 163 and battery terminal body 141 is unstable until the fastening bolt 159 is passed through the interposition portion 171, and therefore there is encountered a problem that the efficiency of the operation is low. In addition, the fastening bolt 159 is withdrawn and inserted, for example, when exchanging the corrosion-protective cover 163, and therefore there is encountered a problem that the efficiency of the operation is low.

SUMMARY OF THE INVENTION

This invention has been made in view of the above circumstances, and an object of the invention is to provide a battery terminal which is capable of enhancing the reliability of mounting of this battery terminal on a battery post, and is capable of enhancing the efficiency of a corrosion-protective cover-attaching operation.

The above object has been achieved by a battery terminal of the first aspect of the present invention comprising a battery terminal body for mounting on a battery post, and a corrosion-protective cover disposed between the battery terminal body and a battery so as to prevent the corrosion of the battery terminal body, wherein the battery terminal body includes a pair of fastening portions each having a curved surface of a generally U-shape, an annular portion which has a battery post insertion hole, and extends from the pair of fastening portions, and a wire connection portion extending from the annular portion; the corrosion-protective cover is molded of a synthetic resin, and includes a base plate portion having a battery post insertion hole, a first hook portion formed at a rear end of the base plate portion so as to be engaged with the wire connection portion, and a second hook portion of a generally U-shape which is formed at a front end of the base plate portion, and has elasticity, and can be retainingly fitted on the curved surfaces, with the first hook portion engaged with the wire connection portion.

In the invention having the above features, the corrosion-protective cover is attached to the battery terminal body by the use of the first and second hook portions. The corrosion-protective cover can be attached to the battery terminal body regardless of a fastening bolt for moving the pair of fastening portions toward each other. In this construction, part of the corrosion-protective cover is not inserted between the pair of fastening portions, and therefore even when the mounting and removal of the battery terminal are repeated, the mounting of the battery terminal on the battery post will not become incomplete. Namely, there does not exist any portion which will interfere with the operation for moving the pair of fastening portions toward each other, and therefore the mounting of the battery terminal on the battery post will not become incomplete. And besides, because of the above construction, the corrosion-protective cover will not be damaged during the fastening operation.

The battery terminal of the second aspect of the present invention, depending from the first aspect of the present invention, is provided in that a free distal end portion of the second hook portion is formed such that those portions of the battery terminal body with which the free end portion is first brought into contact are the curved surfaces. In the invention having this feature, the free end portion of the second hook portion positively slides over the curved surfaces, and is expanded during the attaching operation. Then, when the free end portion slides past the curved surfaces, the retaining engagement of the second hook portion with the curved surfaces is completed. The portions of the battery terminal body with which the free end portion is first brought into contact are the curved surfaces, and therefore the free end portion can easily slide past the curved surfaces.

The battery terminal of the third aspect of the present invention, depending from the second aspect of the present invention, is provided in that the free end portion is formed into a radiused shape. In the invention having this feature, the free end portion of the second hook portion smoothly slides over the curved surfaces.

The battery terminal of a fourth aspect of the present invention, depending from any one of first to third apects, is provided in that a center of the second hook portion is closer to the battery than a center of each of the curved surfaces is. In the invention having this feature, when the second hook portion becomes retainingly fitted on the curved surfaces, this second hook portion urges the base plate portion into intimate contact with the battery terminal body. This serves to avoid the formation of an unnecessary gap, to prevent the shaking of the corrosion-protective cover and to prevent the disengagement of the corrosion-protective cover. Incidentally, when the center of the second hook portion is disposed closer to the battery post than the center of each curved surface is, this is effective.

The battery terminal of the fifth aspect of the present invention, depending from any one of first to fourth aspects, is provided in that displacement prevention portions for preventing the displacement of the corrosion-protective cover relative to the battery terminal body are formed respectively at right and left side edges of the base plate portion. In the invention having this feature, the corrosion-protective cover, attached to the battery terminal body, is prevented from being displaced in the right and left directions. And besides, these displacement prevention portions function also as positioning means when attaching the corrosion-protective cover to the battery terminal body.

The battery terminal of the sixth aspect of the present invention, depending from the fifth aspect, is provided in that ribs, having parallel surfaces in the right-left direction, are formed respectively at the displacement prevention portions, and are inserted into the battery terminal body. In the invention having this feature, the second hook portion and the ribs can hold the battery terminal body in a gripping manner. A force acts on the ribs, so that the deformation of the base plate portion toward the battery is prevented, and the corrosion-protective cover is kept in intimate contract with the battery terminal body.

The first aspect of the present invention achieves an advantage that the reliability of mounting of the battery terminal on the battery post is enhanced. There is achieved another advantage that the efficiency of the corrosion-protective cover-attaching operation is enhanced.

The second aspect of the present invention achieves an advantage that the free end portion can easily slide past the curved surfaces so that the second hook portion can positively be retainingly fitted on the curved surfaces.

The third aspect of the present invention achieves an advantage that the free end portion can more easily slide past the curved surfaces.

The fourth aspect of the present invention achieves an advantage that the corrosion-protective cover can be urged into intimate contact with the battery terminal body.

The fifth aspect of the present invention achieves an advantage that the corrosion-protective cover is prevented from displacement in the right and left directions. There is achieved another advantage that the displacement prevention portions function also as positioning means when attaching the corrosion-protective cover.

The sixth aspect of the present invention achieves an advantage that the force of holding of the corrosion-protective cover on the battery terminal body is increased.

DETAILED DESCRIPTION OF THE PREFERRED EMBODIMENTS

The invention will now be described with reference to the drawings.

Figure 1:
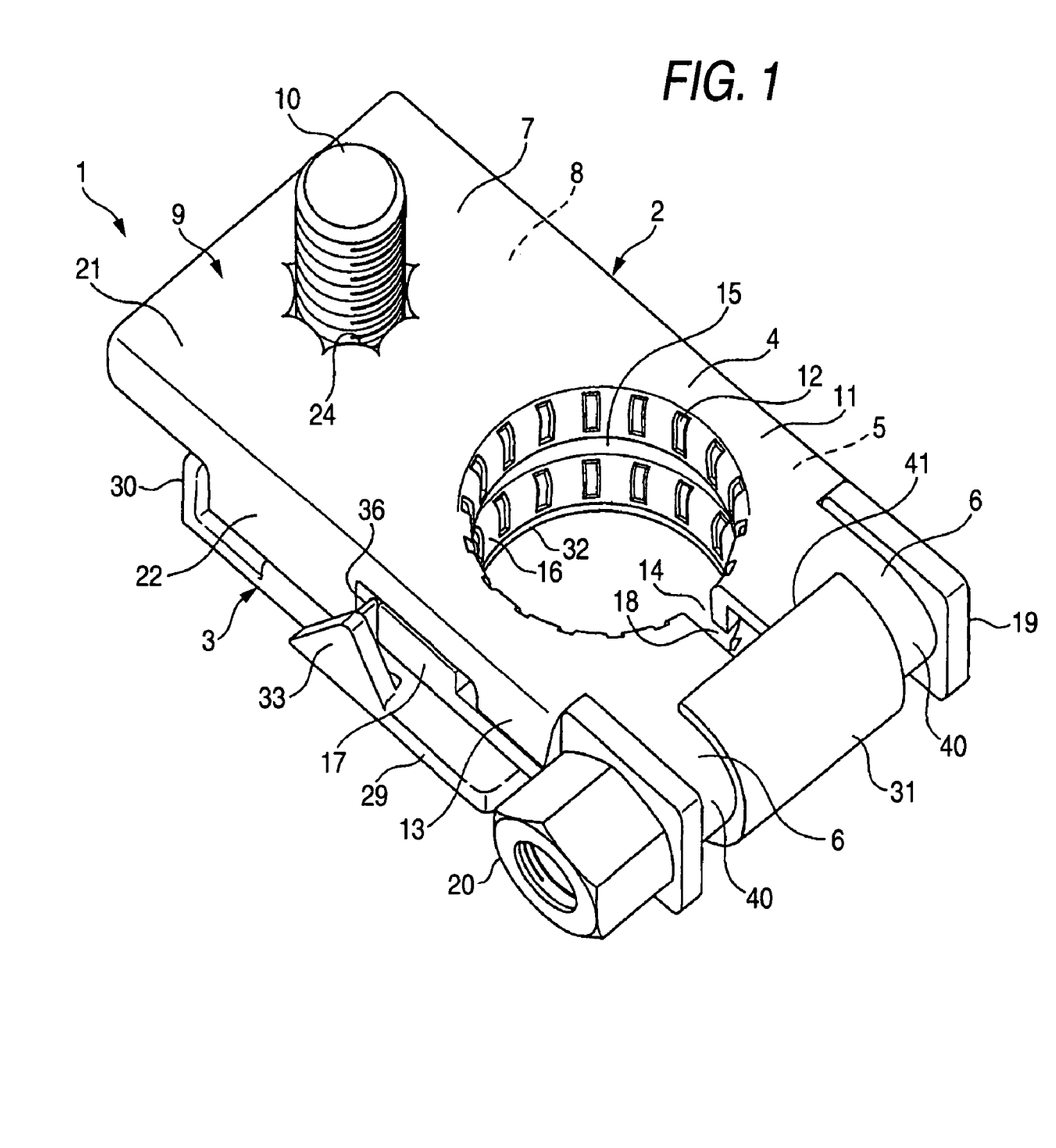
FIG. 1 is a perspective view of one preferred embodiment of a battery terminal of the present invention (as seen from the front side)
Figure 2:
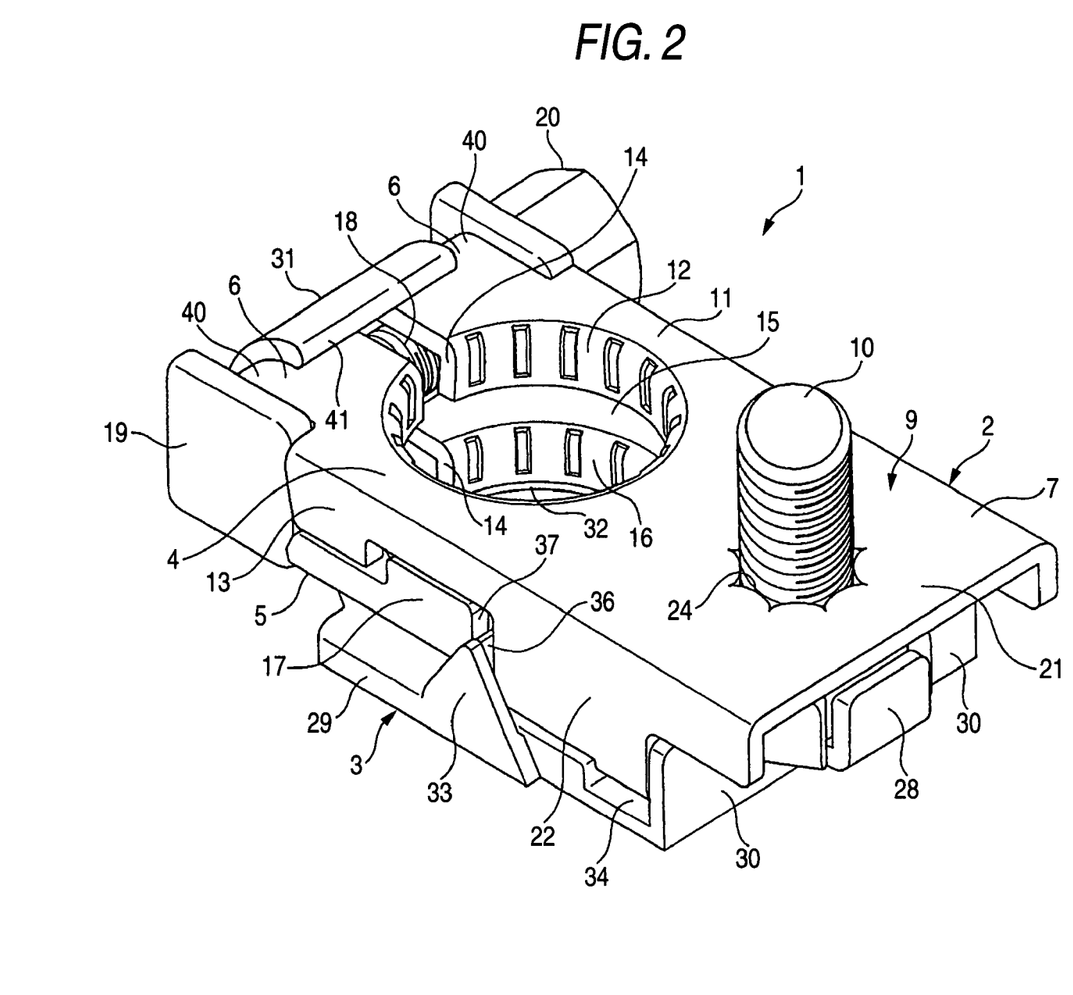
FIG. 2 is a perspective view of the battery terminal of FIG. 1 as seen from the rear side.
Figure 3:
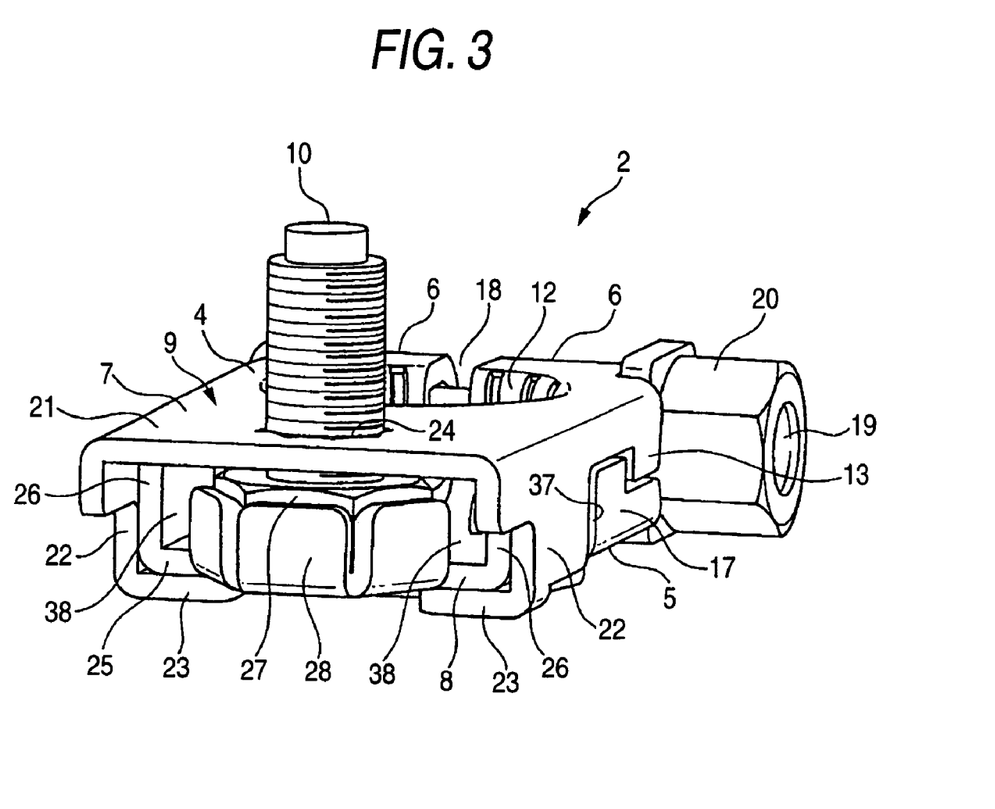
FIG. 3 is a perspective view of a battery terminal body as seen from the rear side.
Figure 4:
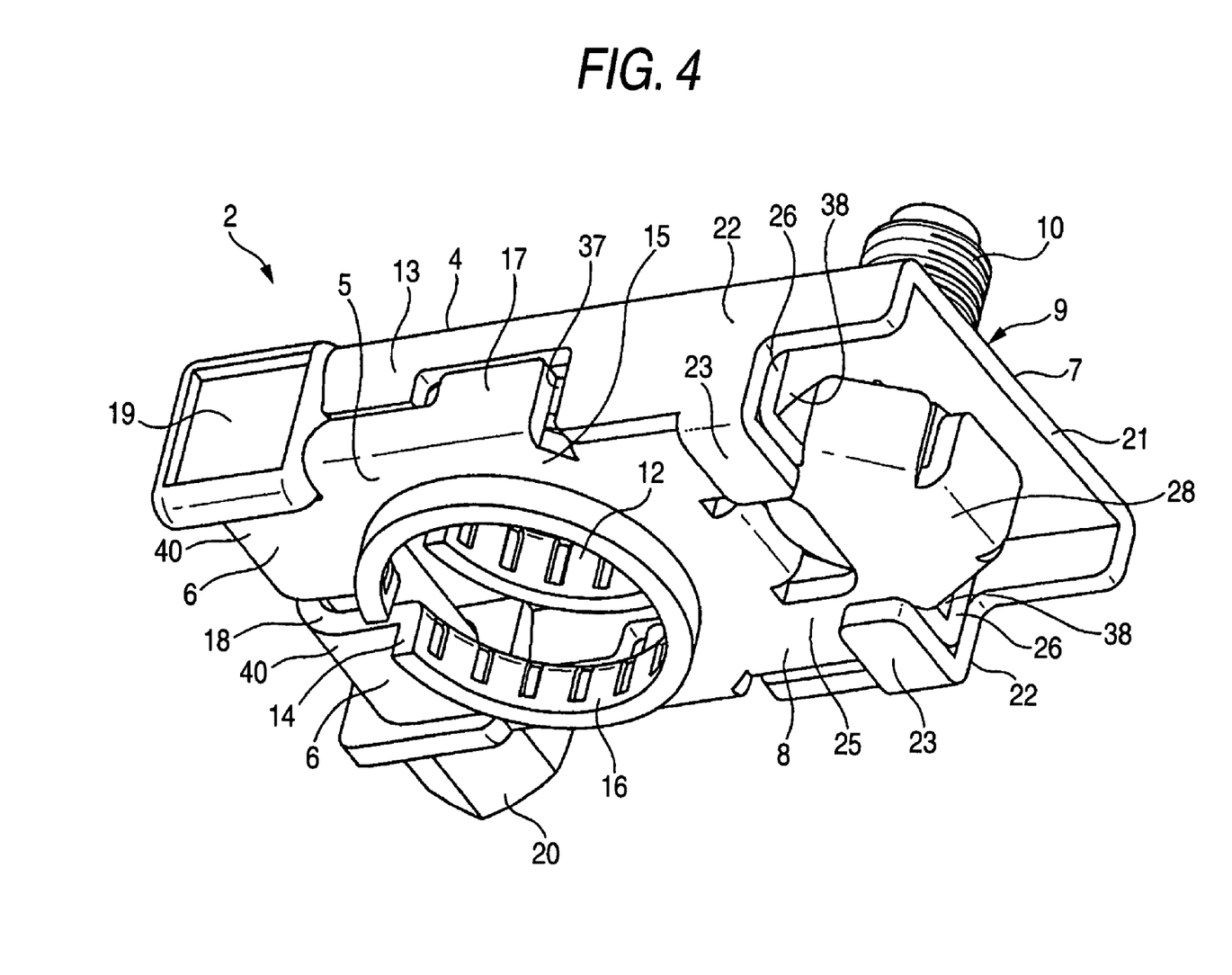
FIG. 4 is a perspective view of the battery terminal body as seen from the rear side and also from the lower side.
Figure 5:
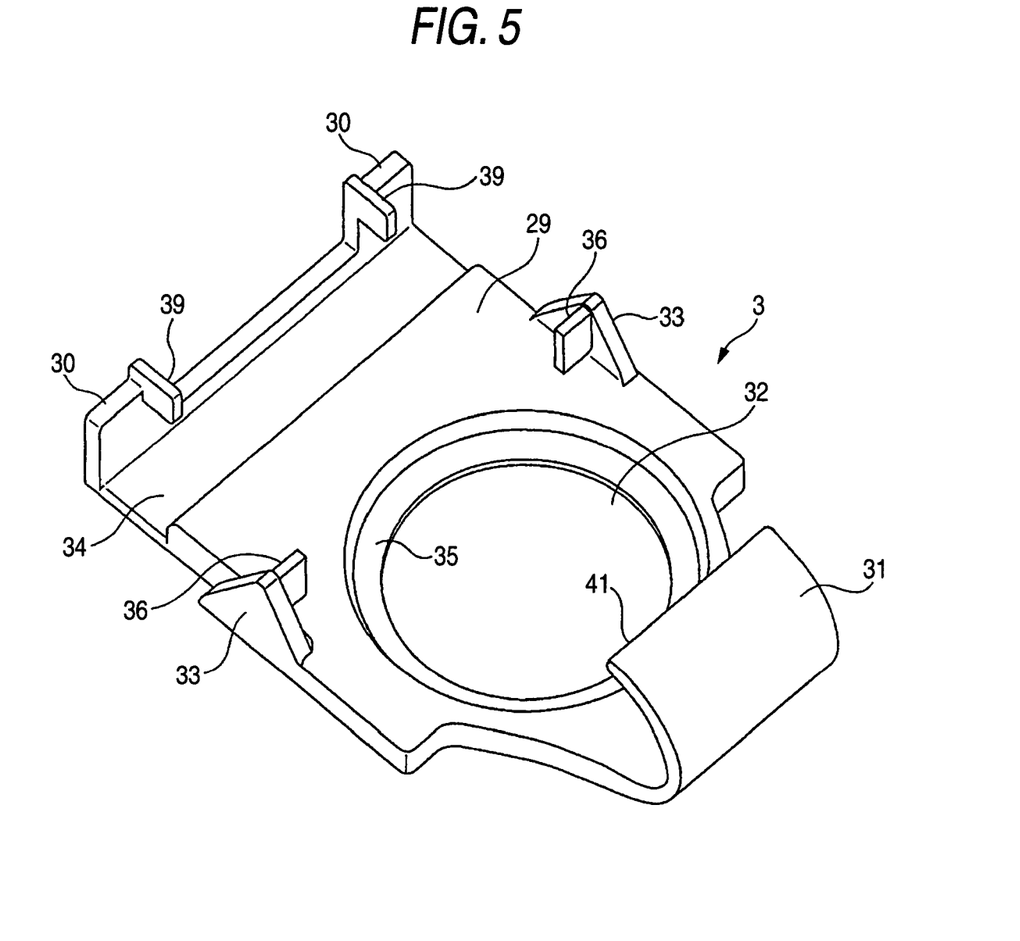
FIG. 5 is a perspective view of a corrosion-protective cover as seen from the front side.
Figure 6:
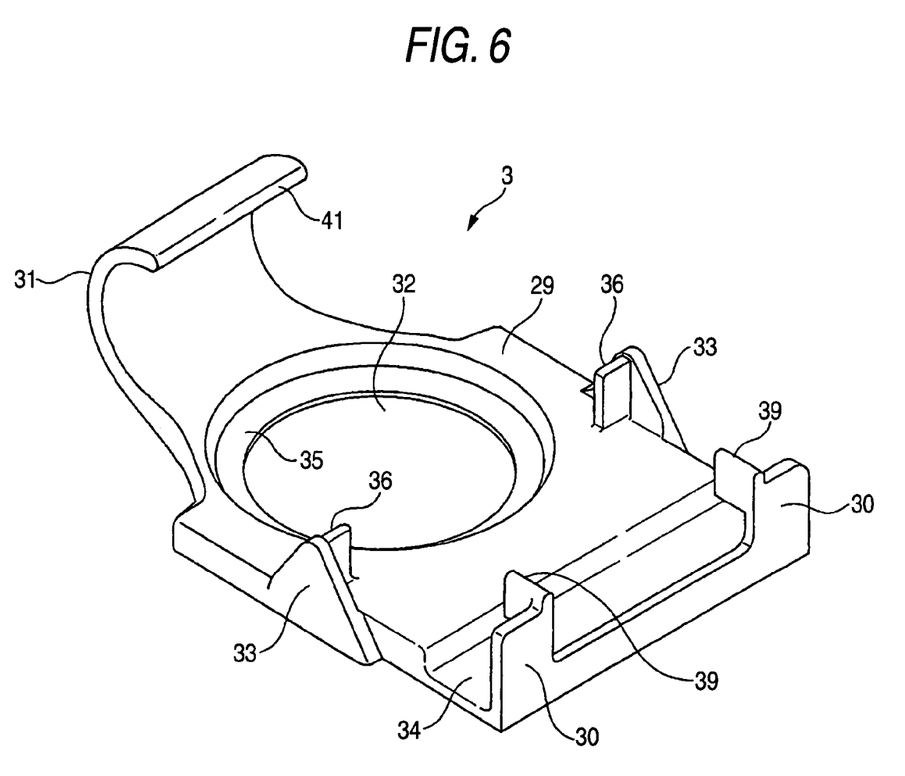
FIG. 6 is a perspective view of the corrosion-protective cover as seen from the rear side.
Figure 7A:
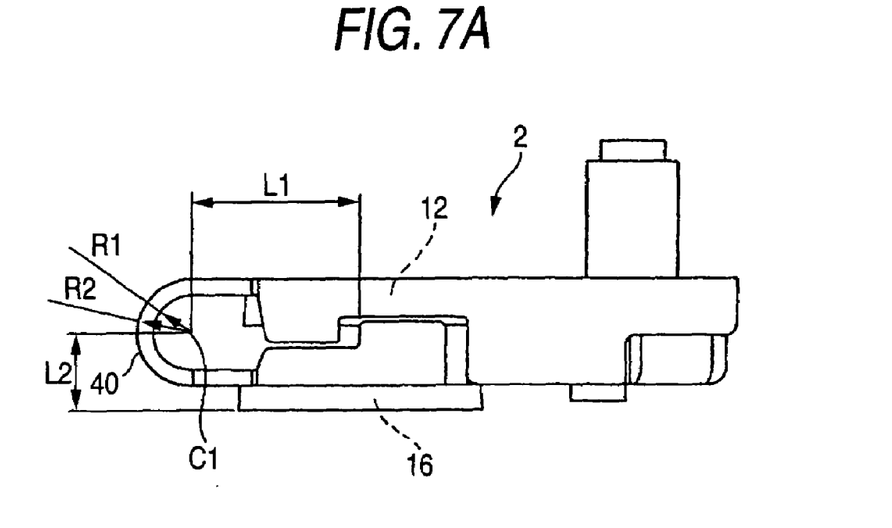
FIG. 7A is a side-elevational view of the difference between the centers of the battery terminal body.
Figure 7B:
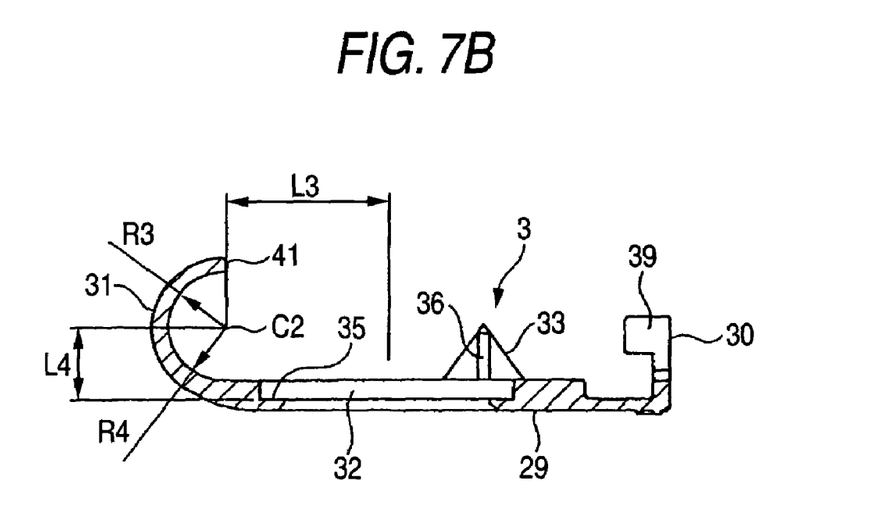
FIG. 7B is a cross-sectional view of the corrosion-protective cover.
Figure 8A:
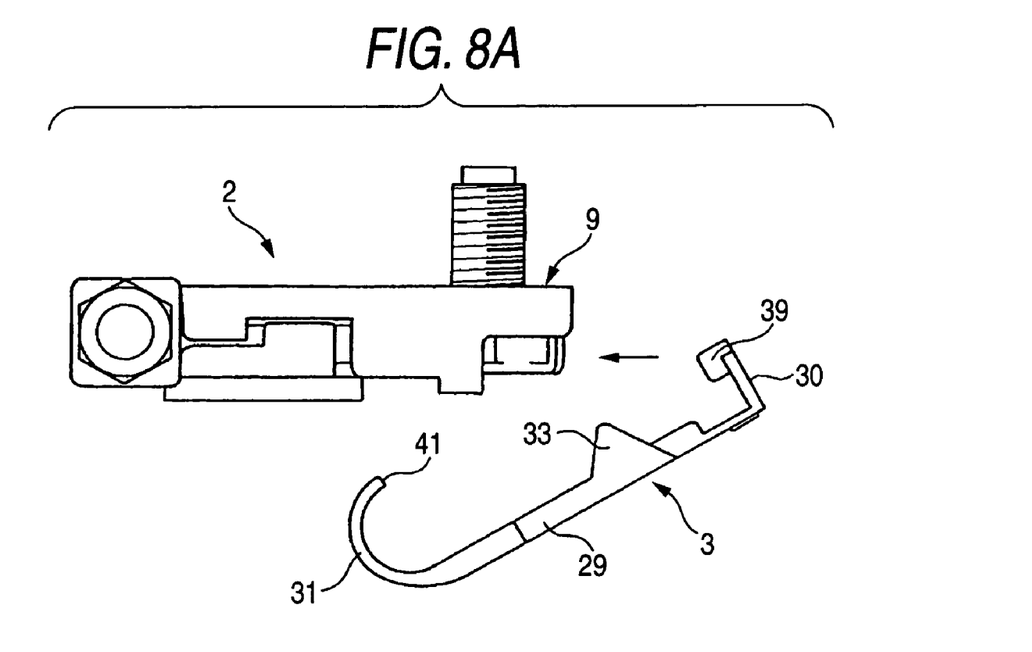
FIG. 8A is a side-elevational view of a first step of a process of attaching the corrosion-protective cover to the battery terminal body.
Figure 8B:
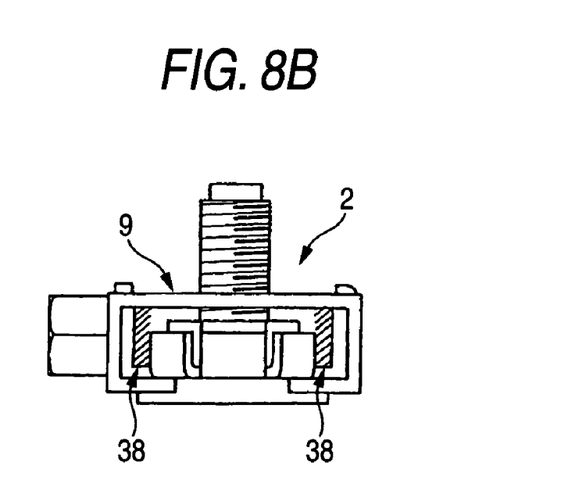
FIG. 8B is a view explanatory of the positions of fitting spaces.
Figure 9:
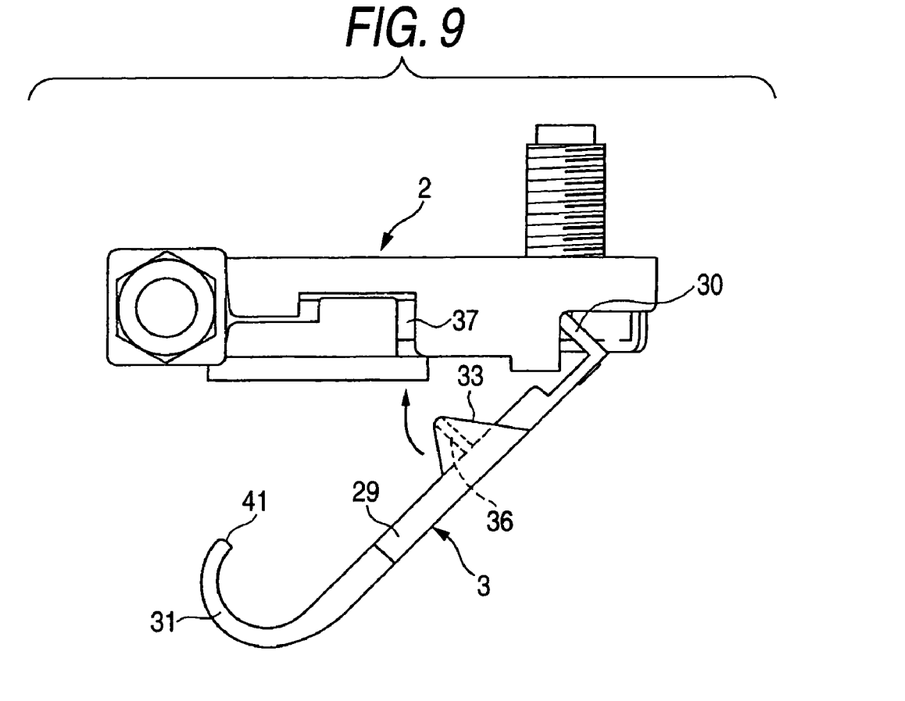
FIG. 9 is a view explanatory of a second step of the process of attaching the corrosion-protective cover to the battery terminal body.
Figure 10:
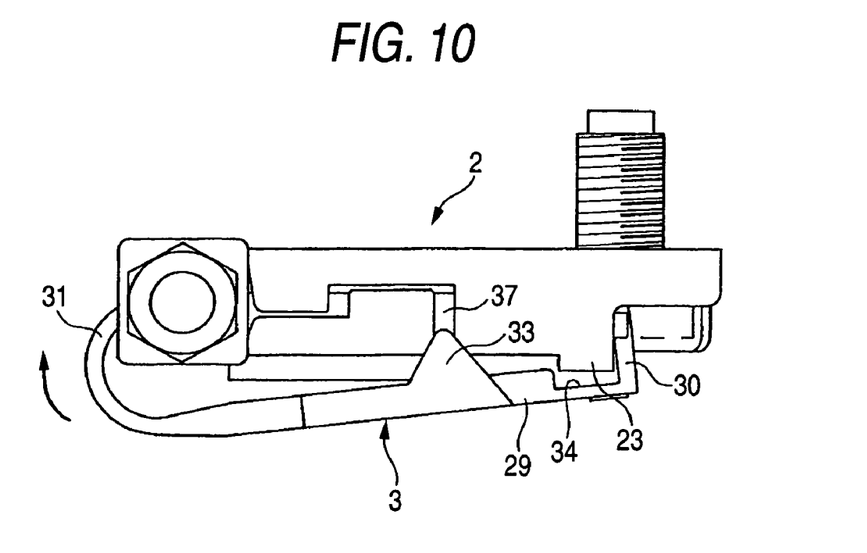
FIG. 10 is a view explanatory of a third step of the process of mounting the corrosion-protective cover to the battery terminal body.

FIGS. 1 and 2 are perspective views showing one preferred embodiment of a battery terminal of the present invention. FIGS. 3 and 4 are perspective views of a battery terminal body, FIGS. 5 and 6 are perspective views of a corrosion-protective cover, FIG. 7 is a view explanatory of the difference between the centers, and FIGS. 8 to 10 are views explanatory of an attaching process.

In FIGS. 1 and 2, reference numeral 1 denotes the battery terminal for mounting around a known battery post 103 (see FIG. 11; The same shall apply hereinafter) having such a tapering peripheral surface that its distal end is smaller in diameter than its proximal end. The battery terminal 1 comprises the battery terminal body 2 for connection to a battery (not shown) mounted on a mobile body such as an automobile (although not particularly limited to such a mobile body), and the corrosion-protective cover 3 for preventing the corrosion of the battery terminal body 2. The construction of each part will be described below in detail.

The battery terminal body 2 is produced by pressing an electrically-conductive metal sheet. In this embodiment, the battery terminal body is plated with Sn. The battery terminal body 2 includes a pair of annular portions 4 and 5, and a pair of fastening portions 6 and 6, and a wire connection portion 9 comprising a pair of joint plates 7 and 8. The battery terminal body 2 further includes a terminal fixing bolt 10 held by the pair of joint plates 7 and 8, and a nut (not shown) threaded on the terminal fixing bolt 10. The battery terminal body 2 further includes a fastening bolt 19 (described later), and a nut 20 threaded on the fastening bolt 19. An external connection terminal (not shown) is adapted to be connected to the wire connection portion 9.

In this specification, the axial direction of the battery post 103 will be defined as an upward-downward direction (vertical direction), and the distal end of the battery post 103 will be defined as the upper end while the proximal end thereof will be defined as the lower end. Therefore, the annular portion 4 is disposed at the upper side while the annular portion 5 is disposed at the lower side. Similarly, the joint plate 7 is disposed at the upper side while the joint plate 8 is disposed at the lower side.

In FIGS. 1 to 4, the annular portion 4 includes an upper base plate 11 in the form of a flat plate. A battery post insertion hole 12 for the insertion of the battery post 103 therein is formed through a generally-central portion of the upper base plate 11 in the upward-downward direction. Engagement portions 13 and 13, each having a downwardly-directed distal end, extend respectively from opposite (right and left) side edges of the upper base plate 11.

The battery post insertion hole portion 12 is the portion for contact with the peripheral surface of the battery post 103, and this battery post insertion hole 12 is formed by bending the relevant portion from the upper base plate 11 in such a manner that its distal end is directed downwardly. The battery post insertion hole 12 is formed into an annular shape, and has a diameter generally equal to the diameter of the distal end portion of the battery post 103. The battery post insertion hole 12 is interrupted at a region where a gap between the fastening portions 6 and 6 exists. Reference numeral 14 denotes this interrupted portion of the battery post insertion hole 12.

The annular portion 5 includes a lower base plate 15 in the form of a flat plate. A battery post insertion hole 16 for the insertion of the battery post 103 therein is formed through a generally-central portion of the lower base plate 15 in the upward-downward direction. Engagement portions 17 and 17, each having an upwardly-directed distal end, extend respectively from opposite (right and left) side edges of the lower base plate 15. The engagement portions 17 and 17 are disposed in opposed relation to the engagement portions 13 and 13 of the annular portion 4, respectively. The engagement portions 13 and 13 and the engagement portions 17 and 17 are provided to keep the annular portions 4 and spaced from each other in the upward-downward direction.

The battery post insertion hole portion 16 is the portion for contact with the peripheral surface of the battery post 103, and this battery post insertion hole 16 is formed by bending the relevant portion from the lower base plate 15 in such a manner that its distal end is directed downwardly. The battery post insertion hole 16 is formed into an annular shape, and has a diameter generally equal to the diameter of the proximal end portion of the battery post 103. The battery post insertion hole 16 is interrupted at a region where the gap between the fastening portions 6 and 6 exists. This interrupted portion (designated also by reference numeral 14) of the battery post insertion hole 16 is formed just beneath the above-mentioned interrupted portion 14, and is similar thereto.

The fastening portions 6 and 6 interconnect the upper and lower base plate portions 11 and 15 in such a manner that the two base plate portions 11 and 15 are spaced from each other in the upward-downward direction in a superposed manner. Each of the fastening portions 6 and 6 is curved into a U-shape in the forward-rearward direction. Namely, each of the fastening portions 6 and 6 has a U-shaped curved surface, and upper ends of the fastening portions 6 and 6 are continuous with the front end of the upper base plate 11 (that is, continuous respectively with those portions of the front end disposed respectively on opposite (right and left) sides of the upper interrupted portion 14). Lower ends of the fastening portions 6 and 6 are continuous with the front end of the lower base plate 15 (that is, continuous respectively with those portions of the front end disposed respectively on opposite (right and left) sides of the lower interrupted portion 14). A fastening gap 18 is formed between the fastening portions 6 and 6, and this fastening gap 18 is in communication with the interrupted portions 14 and 14, and the fastening portions 6 and 6 are juxtaposed to each other in the right-left direction. A bolt insertion hole is defined by an inner surface of each fastening portion 6.

The fastening bolt 19 is inserted in the bolt insertion holes of the fastening portions 6 and 6 in such a manner that this fastening bolt 19 extends across and through the fastening gap 18. The fastening bolt 19 cooperates with the nut 20 (threaded on its distal end portion) to fasten the fastening portions 6 and 6 (disposed respectively on the opposite sides of the fastening gap 18) toward each other (When this fastening operation is effected, the battery post insertion holes 12 and 16 are reduced in diameter). A head of the fastening bolt 19 is so designed as to abut against the engagement portions 13 and 17 to prevent the rotation of this fastening bolt.

The joint plate 7 includes a contact plate portion 21 extending from the rear end of the upper base plate 11, downwardly-directed side walls 22 and 22 formed respectively at opposite (right and left) side edges of the contact plate portion 21, and inwardly-directed lower walls 23 and 23 extending respectively from the side walls 22 and 22. The contact plate portion 21 is in the form of a rectangular flat plate, and a bolt insertion hole 24 for the passage of the terminal fixing bolt 10 therethrough is formed through a central portion of the contact plate portion 21.

The joint plate 8 includes a rectangular flat plate portion 25 extending from the rear end of the lower base plate 15, and upwardly-directed side walls 26 and 26 formed respectively at opposite (right and left) side edges of the rectangular flat plate portion 25. A head rotation prevention portion 28, having a shape corresponding to the outer shape of a head 27 of the terminal fixing bolt 10, is formed at the rectangular flat plate portion 25 at a center axis thereof. The head rotation prevention portion 28 is formed by raising a plurality of piece portions. The side walls 26 and 26 of the joint plate 8 are disposed inwardly of the side walls 22 and 22 of the joint plate 7, respectively. A fitting space 38 (described later) is formed between each side wall 26 of the joint plate 8 and the head rotation prevention portion 28.

In FIGS. 1, 2, 5 and 6, the corrosion-protective cover 3 is a member which is to be interposed between the battery and the battery terminal body 2. This cover 3 is molded of a synthetic resin so that it can have a corrosion-resistance to a battery liquid. In this embodiment, the corrosion-protective cover 3 is molded of PP (polypropylene) partly because it is an inexpensive material (The material is not limited to it). The corrosion-protective cover 3 includes a base plate portion 29, first hook portions 30 and 30, and a second hook portion 31. The corrosion-protective cover 3 is so designed as to be attached to the battery terminal body 2 only by fitting connection.

The base plate portion 29 is a plate-like portion for intimate contact with the annular portion 5 and joint plate 8 of the battery terminal body 2 in facing relation thereto. A battery post insertion hole 32 for the passage of the battery post 103 therethrough is formed through the base plate portion 29 at a center axis thereof. Displacement prevention portions 33 and 33 for preventing the displacement of the corrosion-protective cover relative to the battery terminal body 2 are formed respectively at opposite (right and left) side edges of the base plate portion 29. A groove-like escape portion 34, corresponding to the lower walls 23 and 23 of the battery terminal body 2, is formed at a rear end portion of the base plate portion 29.

The battery post insertion hole 32 conforms in shape to the battery post insertion hole 16 in the battery terminal body 2. In this embodiment, this hole 32 is formed into a stepped configuration. Reference numeral 35 denotes a receiving surface for the battery post insertion hole portion 16. The displacement prevention portions 33 are so formed as to face the opposite side surfaces of the battery terminal body 2, respectively. In this embodiment, each of the displacement prevention portions 33 has a triangular projection-shape. Ribs 36 and 36, having parallel surfaces in the right-left direction, are formed at the displacement prevention portions 33 and 33, respectively in such a manner that the rib 36 are perpendicularly extended from the displacement prevention portions 33. The ribs 36 and 36 are adapted to be inserted respectively into grooves 37 and 37 formed respectively in the opposite side surfaces of the battery terminal body 2.

The first hook portions 30 and 30 are formed upright at the rear end of the base plate portion 29. The first hook portions 30 and 30 are spaced a predetermined distance from each other, and more specifically are arranged in conformity with the arrangement of the fitting spaces 38 and 38 formed in the wire connection portion 9 of the battery terminal body 2. The first hook portions 30 and 30 have claws 39 and 39, respectively, and these claws 39 and 39 are inserted respectively into the fitting spaces 38 and 38, and are engaged respectively in these fitting spaces.

The second hook portion 31 is formed at the front end of the base plate portion 29 in continuous relation thereto. The second hook portion 31 has elasticity, and is in the form of a U-shaped sheet. The second hook portion 31 is so designed as to be retainingly fitted on curved surfaces 40 of the fastening portions 6 and 6, with the first hook portions 30 and 30 engaged respectively in the fitting spaces 38 and 38 of the wire connection portion 9. The second hook portion 31 is so designed that it can be expanded while its free end portion (distal end portion) 41 thereof slides over the curved surfaces 40 and 40, and when the free end portion 41 slides past the curved surfaces 40 and 40, this retaining (fitting) engagement operation is completed.

The free end portion 41 is formed into a radiused (or rounded) shape to have a curved surface. The free end portion 41 is formed such that those portions of the battery terminal body 2 with which the free end portion 41 is first brought into contact are the curved surfaces 40 and 40 (so that the free end portion 41 can easily slide past the curved surfaces 40 and 40.). If those portions of the battery terminal body with which the free end portion 41 is first brought into contact are the lower surfaces of the fastening portions 6 and 6, the free end portion 41 is liable to be crushed toward the base plate portion 29 by these lower surfaces, and therefore will not slide past the curved surfaces.

In FIG. 7, the battery terminal body 2 is formed such that the distance L1 between the center axis of the battery post insertion holes 12 and 16 and a center C1 of each curved surface 40 is 15.5 mm, that the distance L2 between the lowermost surface of the battery terminal body 2 (that is, the lower surface of the battery post insertion hole portion 16) and the center C1 of each curved surface 40 is 7.4 mm, and that a radius R1 of curvature of the inner surface of each curved surface 40 is 3.4 mm while a radius R2 of curvature of the outer surface thereof is 5.0 mm.

On the other hand, the corrosion-protective cover 3 is formed such that the distance L3 between the center axis of the battery post insertion hole 32 and a center C2 of the second hook portion 31 is 15.0 mm, that the distance L4 between the receiving surface 35 of the battery post insertion hole 32 and the center C2 of the second hook portion 31 is 7.0 mm, and that a radius R3 of curvature of an inner surface of an upper portion of the second hook portion 31 is 5.4 mm while a radius R4 of an inner surface of a lower portion of the second hook portion 31 is 5.0 mm.

Because of this dimensional relation, the second hook portion 31 is slightly elastically deformed during the attaching operation, and is brought into fitting (retaining) engagement with the curved surfaces 40 and 40 of the fastening portions 6 and 6. And besides, the corrosion-protective cover 3 can be brought into more intimate contact with the battery terminal body 2 because of this dimensional relation. The above dimensions are given merely as one example.

The corrosion-protective cover 3 is so formed that the distal end of the free end portion 41 can be disposed just above the center C2 of the second hook portion 31. Because of this positional relation, the fastening gap 18 will not be completely covered with the second hook portion 31 (The fastened condition can be confirmed.).

Next, In the above construction, the operation for attaching the corrosion-protective cover 3 to the battery terminal body 2 will be described. The attaching operation is completed by effecting first to third steps.

In the first step shown in FIG. 8, the first hook portions 30 and 30 of the corrosion-protective cover 3 are engaged respectively in the fitting spaces 38 and 38 (indicated by hatching portions, respectively) in the battery terminal body 2. At this time, the corrosion-protective cover 3 is brought toward the wire connection portion 9 of the battery terminal body 2, with the second hook portion 31 directed obliquely downwardly as shown in the drawings. After the first hook portions 30 and 30 are engaged respectively in the fitting spaces 38 and 38, the process proceeds to the second step.

In the second step shown in FIG. 9, the corrosion-protective cover 3 is turned (or pivotally moved) toward the battery terminal body 2, with the first hook portions 30 and 30 kept engaged respectively in the fitting spaces 38 and 38. At this time, the ribs 36 and 36 of the displacement prevention portions 33 and 33 are inserted respectively into the grooves 37 and 37 formed respectively in the opposite side surfaces of the battery terminal body 2. The process shifts from the second step to the third step in a continuous manner.

In the third step shown in FIG. 10, the second hook portion 31, held against the curved surfaces 40 and 40, is expanded while the free end portion 31 slides over these curved surfaces 40 and 40, and the free end portion 31 is slid past the curved surfaces 40 and 40, thereby bringing the second hook portion 31 into retaining (fitting) engagement with the curved surfaces 40 and 40. When the second hook portion 31 is thus retainingly fitted on the curved surfaces 40 and 40, the series of attaching operation steps are completed. A force, produced as a result of the retaining (fitting) engagement of the second hook portion 31, acts on the relevant portions. The corrosion-protective cover 3 is attached to the battery terminal body 2 in intimately-contacted relation thereto.

Next, the operation for fixedly mounting the battery terminal 1 on the battery post 103 (that is, the operation for connecting the battery terminal 1 to the battery post) will be described.

First, the battery terminal 1 is moved downward, and the inner surfaces of the battery post insertion holes 12 and 16 are brought into contact with the peripheral surface of the battery post 103. Then, the battery terminal 1 is arranged to be set in a predetermined direction. Then, the nut 20 is tightened by a tool (not shown), such as an impact wrench, laterally of the battery terminal 1. As a result, the battery post insertion holes 12 and 16 are contracted in the diameter-reducing direction, so that the inner surfaces of the battery post insertion holes 12 and 16 are brought into press-contact with the peripheral surface of the battery post 103, thus completing the mounting of the battery terminal 1.

As described above with reference to FIGS. 1 to 10, the battery terminal 1 of the invention is of such a construction that the corrosion-protective cover 3, having the first hook portions 30 and 30 and the second hook portion 31, is attached to the battery terminal body 2. Therefore, in contrast with the conventional example, the corrosion-protective cover can be efficiently attached to the battery terminal body 2 without inserting the fastening bolt 19 (which moves the fastening portions 6 and 6 toward each other). And besides, the corrosion-protective cover 3 of the battery terminal 1 of the invention is of the above construction, and therefore in contract with the conventional example, the reliability of mounting of the battery terminal on the battery post 103 is enhanced. Furthermore, the corrosion-protective cover 3 of the battery terminal 1 of the invention is of the above construction, and therefore in contrast with the conventional example, the corrosion-protective cover 3 is prevented from damage.

In the invention, various modifications can be made without departing from the subject matter of the invention.

Although the above description is directed to the battery terminal body 2 of the type in which the fastening bolt 19 is tightened laterally of the battery terminal, the invention is not limited to such a type, but can be applied to the type of battery terminal body in which a fastening bolt is tightened from the upper side, and this tightening force is converted into a lateral fastening force so as to move the fastening portions toward each other, because the corrosion-protective cover 3 can be attached to any suitable battery terminal body having a curved surface.

What is claimed is:

1. A battery terminal comprising:
   a battery terminal body for mounting on a battery post, said battery terminal body including:
   a pair of fastening portions each having a curved surface of a generally U-shape;
   an annular portion having a battery post insertion hole and extending from said pair of fastening portions;
   a wire connection portion extending from said annular portion;
   a corrosion-protective cover, molded of a synthetic resin, disposed between said battery terminal body and a battery so as to prevent the corrosion of said battery terminal body, said corrosion-protective cover including:
   a base plate portion having a battery post insertion hole;
   a first hook portion formed at a rear end of said base plate portion so as to be engaged with said wire connection portion; and
   a second hook portion, having elasticity and a generally U-shape, formed at a front end of said base plate portion and retainingly fitted on said curved surfaces with said first hook portion being engaged with said wire connection portion.

2. A battery terminal according to claim 1, wherein a free distal end portion of said second hook portion is formed such that said curved surfaces of said battery terminal body are first brought into contact with said free distal end portion.

3. A battery terminal according to claim 2, wherein said free distal end portion is formed into a radiused shape.

4. A battery terminal according to claim 1, wherein a center of said second hook portion is closer to said battery than a center of each of said curved surfaces.

5. A battery terminal according to claim 1, wherein said base plate portion has displacement prevention portions for preventing the displacement of said corrosion-protective cover relative to said battery terminal body, said displacement prevention portions formed respectively at right and left side edges of said base plate portion.

6. A battery terminal according to claim 5, wherein each displacement prevention portions has plate shaped ribs inserted into said battery terminal body in such a manner that said ribs are erected respectively from said displacement prevention portions.

7. The battery terminal according to claim 1, wherein said second hook portion is positioned closer to said battery post insertion hole than said first hook portion.

8. The battery terminal according to claim 1, wherein said second hook portion is formed at a distal end of said front end of said base plate portion and said first hook portion is formed at a distal end of said rear end of said base plate portion.

* * * * *